(12) United States Patent
Thomas (10) Patent No.: US 7,192,053 B2
(45) Date of Patent: Mar. 20, 2007

(54) AUTOMOTIVE VEHICLE AIR BAG SYSTEM

(75) Inventor: Scott David Thomas, Novi, MI (US)

(73) Assignee: General Motors Corporation, Detroit, MI (US)

( * ) Notice: Subject to any disclaimer, the term of this patent is extended or adjusted under 35 U.S.C. 154(b) by 349 days.

(21) Appl. No.: 10/660,965

(22) Filed: Sep. 12, 2003

(65) Prior Publication Data

US 2005/0057029 A1    Mar. 17, 2005

(51) Int. Cl.
*B60R 21/16*    (2006.01)

(52) U.S. Cl. .................. 280/739; 280/743.1; 280/743.2

(58) Field of Classification Search ............. 280/739, 280/741, 743.1, 743.2, 736, 740
See application file for complete search history.

(56) References Cited

U.S. PATENT DOCUMENTS

| | | | |
|---|---|---|---|
| 5,362,101 A * | 11/1994 | Sugiura et al. .......... | 280/743.2 |
| 6,334,627 B1 * | 1/2002 | Heym et al. ............. | 280/743.2 |
| 6,390,501 B1 | 5/2002 | Greib et al. ............. | 280/743.2 |
| 6,422,597 B1 | 7/2002 | Pinsenschaum et al. .... | 280/735 |
| 6,454,300 B1 | 9/2002 | Dunkle et al. ............. | 280/742 |
| 6,511,094 B2 | 1/2003 | Thomas et al. .......... | 280/743.2 |
| 6,513,835 B2 | 2/2003 | Thomas ................... | 280/743.2 |
| 6,561,545 B2 | 5/2003 | Greib et al. ............. | 280/743.2 |
| 6,692,023 B2 * | 2/2004 | Tokita et al. ............ | 280/743.1 |
| 6,832,778 B2 * | 12/2004 | Pinsenschaum et al. .... | 280/739 |
| 6,932,385 B2 * | 8/2005 | Hawthorn et al. .......... | 280/739 |
| 2002/0036400 A1 | 3/2002 | Winters et al. | |
| 2002/0096871 A1 | 7/2002 | Pinsenschaum et al. | |

* cited by examiner

*Primary Examiner*—Paul N. Dickson
*Assistant Examiner*—Toan C. To
(74) *Attorney, Agent, or Firm*—Laura C. Hargitt (57) ABSTRACT

A vehicle air bag assembly including an inflatable air bag cushion and at least one tether having a first portion is provided. The first portion includes a first loop supported at a first location at the cushion. The tether is releasably restrained such that the cushion inflates to a first amount of expansion when the tether is restrained and to a greater second amount of expansion after the tether is released.

24 Claims, 6 Drawing Sheets

AUTOMOTIVE VEHICLE AIR BAG SYSTEM

TECHNICAL FIELD

The present invention is an air bag system for a motor vehicle.

BACKGROUND OF THE INVENTION

Air bags are currently used in many vehicles for supplemental occupant protection during a collision. Air bags deployable to varying depths based upon vehicle conditions are known, as described in U.S. Pat. No. 6,390,501, which is hereby incorporated by reference in its entirety. Tethers attached to an air bag may be restrained or released to achieve a varying depth upon air bag inflation. Tether design may also affect resulting air bag shape at the varied depths. A tether design that enables a consistent, predictable resulting air bag shape is desirable.

SUMMARY OF THE INVENTION

A vehicle having an air bag assembly for impact restraint includes an air bag cushion inflatable to first and second amounts of expansion and deployable in an interior space of the vehicle. The second amount of expansion is greater than the first amount of expansion. The air bag assembly also includes at least one tether. The tether has a first portion which includes a first loop that is supported at a first location at the cushion. The tether is releasably restrained such that, upon inflation of the cushion, the cushion is inflatable to the first amount of expansion when the tether is retrained and the cushion is inflatable to the second amount of expansion after the tether is released. The tether may also have a second portion that is supported at a second location substantially opposing the first location. When the tether has a second portion, the tether is releasably restrained between the first and second portions. The tether has a longitudinal portion extending from the first loop and, preferably, is characterized by an absence of sliding along the longitudinal portion at the first location when the tether is released.

The air bag assembly may further include at least one lateral tether element supported at opposing lateral locations at the cushion, the opposing lateral locations being substantially laterally disposed with respect to the first portion.

A support element may be secured to the cushion at the first location and the first loop may be secured at the support element. The support element may be a tubular slot through which the tether is routed.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
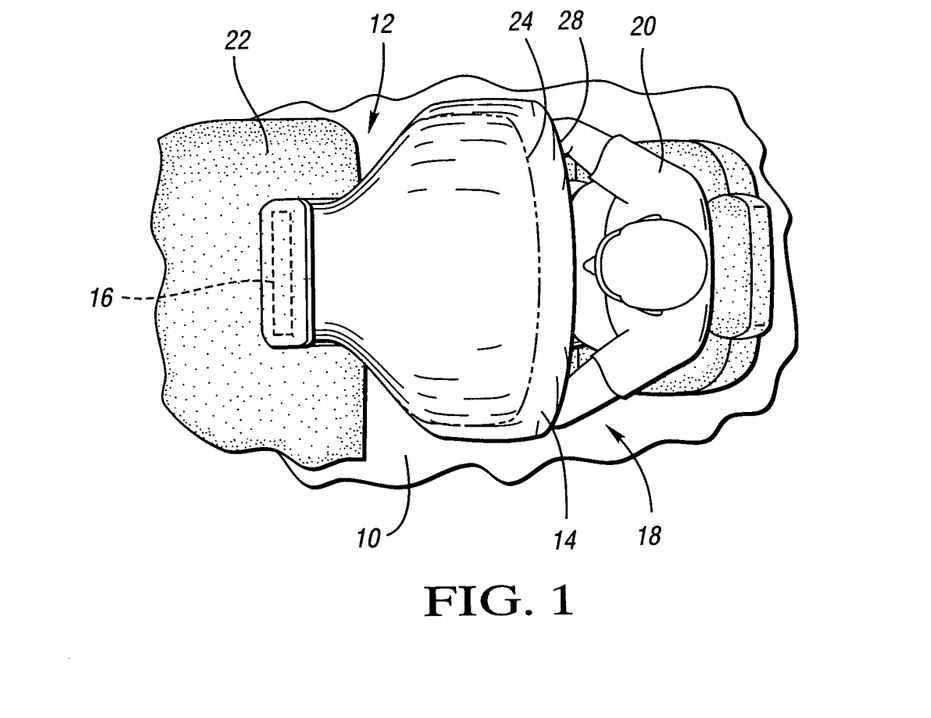
FIG. 1 is an elevational view of an inflated air bag cushion deployed in an interior space of a vehicle between an occupant and an instrument panel.

Reference will now be made to the drawings, wherein like reference numerals are used to designate like components throughout the various views. In FIG. 1, it is seen that a vehicle 10 may include an air bag system 12. The air bag system 12 includes an air bag cushion 14 deployable upon inflation by a gas emitting inflator 16 into an interior space 18 of the vehicle 10 for cushioning of an occupant 20. The air bag system 12 is shown housed within an instrument panel 22. The airbag system 12 may alternatively be housed elsewhere on the vehicle, such as within a vehicle door or a vehicle roof rail. For the present description, the air bag system 12 will be described as being packaged within the instrument panel 22. During a collision of sufficient severity to warrant air bag deployment, a remotely located sensing system, not shown, sends a signal to the air bag system 12 to deploy the cushion 14. The cushion 14 is shown deployed in interior space 18 between the instrument panel 22 and the occupant 20. The present invention provides a cushion 14 which is capable of inflating to two amounts of expansion—a shallower, first amount of expansion 24 (shown in phantom) or a deeper, second amount of expansion 28.

Figure 2A:
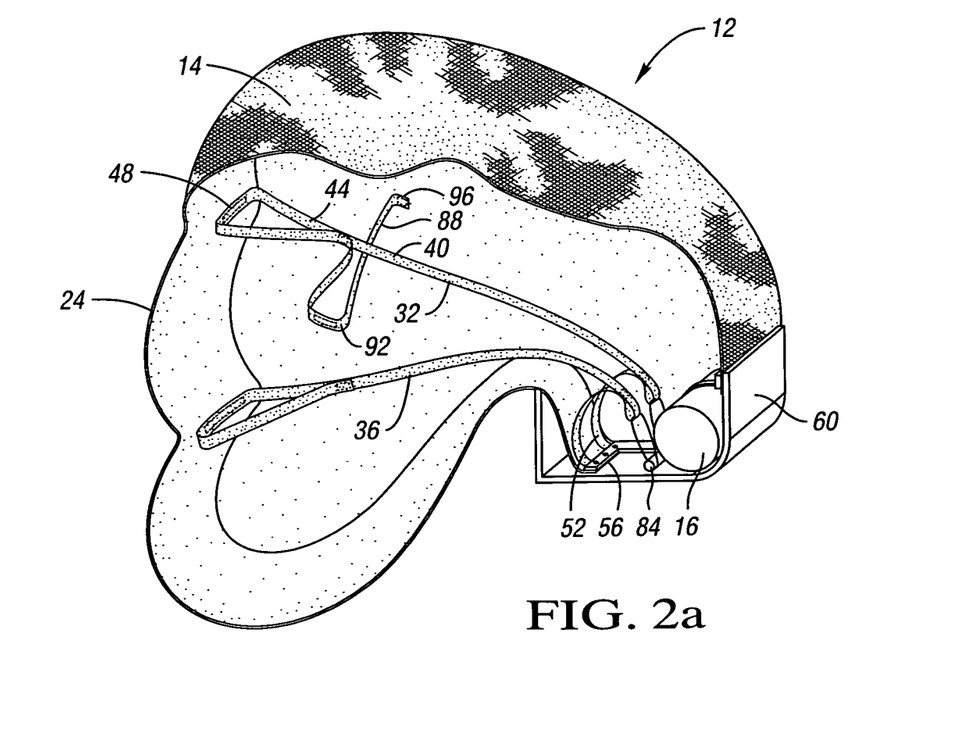
FIG. 2a is a schematic fragmentary perspective illustration of an air bag assembly having tethers, wherein the tethers are restrained and the air bag cushion is inflated to a first amount of expansion.
Figure 2B:
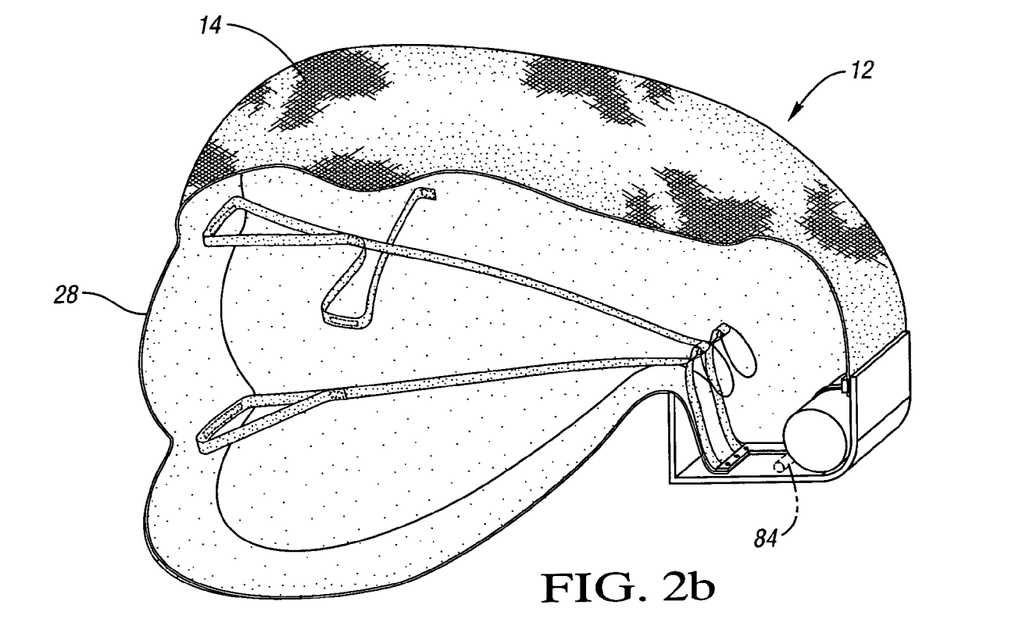
FIG. 2b is a schematic fragmentary perspective illustration of the air bag assembly of FIG. 2a, wherein the tethers are released and the air bag cushion is inflated to a second amount of expansion.
Figure 2C:
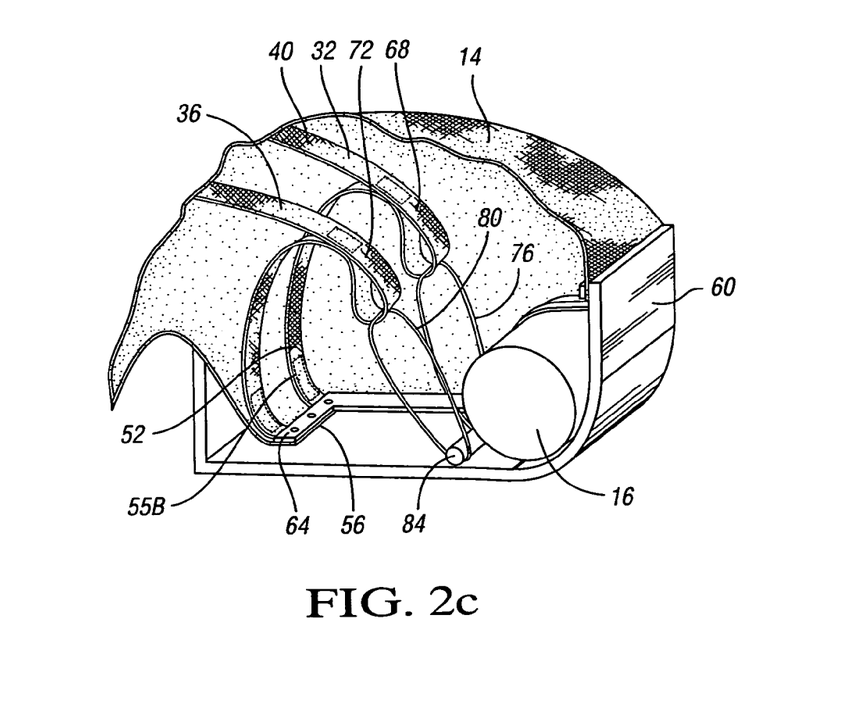
FIGS. 2c–2d are schematic fragmentary perspective views of alternative tether attachment arrangements for the air bag assembly of FIGS. 2a–2b.
Figure 2D:
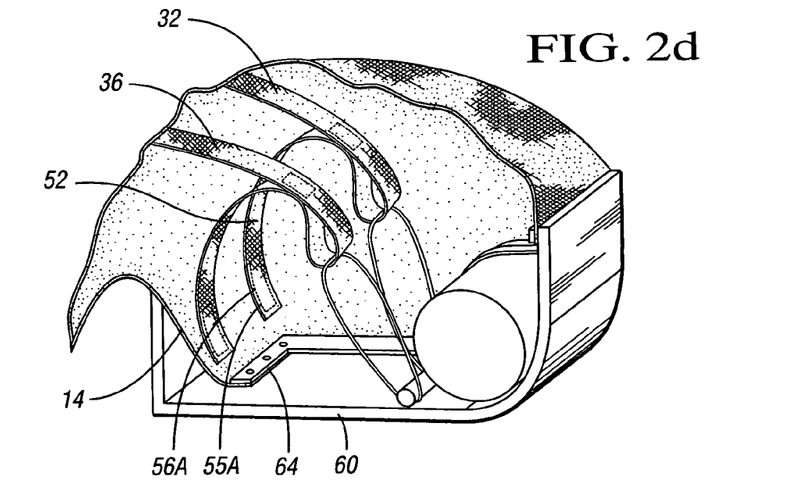

Referring to FIGS. 2a–2b, the air bag system 12 includes the cushion 14 inflated to the first amount of expansion 24 shown in FIG. 2a or, alternatively, to the second amount of expansion 28 shown in FIG. 2b. The air bag system 12 includes a first tether 32. An optional second tether 36 is also illustrated. The tethers 32, 36 have two effective lengths: a restrained length, corresponding to the first amount of expansion 24 and an unrestrained or extended length, corresponding to the second amount of expansion 28. The first tether 32 includes a first portion 40. The first portion 40 includes a first loop 44. In FIG. 2a, the first portion 40 is arranged to form the first loop 44. Alternatively, the first loop 44 may be sewn or otherwise attached to the first portion 40. The first loop 44 is supported at a first attachment location 48, also referred to as a first location, to the cushion 14. The first loop 44 may be so supported by stitching, adhesives or other known methods of attachment. As may be viewed in FIG. 3c, the first loop 44 is configured with a segment secured to the cushion 14 at the first location 48 and two segments extending therefrom which attach to each other opposite the first location 48 to form the closed loop. The configuration of the first loop 44 may be varied by modifying the relative lengths of these segments, thus impacting the resulting profile of the cushion 14 upon inflation. The first tether 32 further includes an optional second portion 52 supported at a second attachment location 56, also referred to as a second location. The second attachment location 56 is substantially opposite to the first attachment location 48 in the inflated cushion 14. As shown in FIG. 2c, the cushion 14 is secured at support structure 60 which, in this case, is a housing (and may be referred to as such) for the inflator 16 and the cushion 14. The cushion 14 is fastened between the support structure 60 and a bracket element 64. As shown in FIG. 2d, the second portion 52 may alternatively be secured at a second location 56A directly to the cushion 14. Stitching 55A shown in FIG. 2d may be used to secure the second portion 52. Optional stitching 55B may also be used to secure the second portion 52 in conjunction with the bracket element 64 as shown in FIG. 2c. As an alternative to stitching 55A, 55B, adhesives or other known forms of securement may be employed. The optional second portion 52 allows the cushion to expand, as shown in FIG. 2b, to the second amount of expansion 28, with the second portion 52 providing some restriction affecting the resulting second amount of expansion 28 because the second portion 52 remains secured at the second location 56 shown in FIG. 2c (or alternative second location 56A shown in FIG. 2d) making the overall length of the first tether 32 a limitation on the second amount of expansion 28.

As shown in FIG. 2c, the first and second tethers 32, 36 each include a second loop 68, 72, respectively. The second loop 68 is disposed between the first portion 40 and the second portion 52 on the first tether 32. (On a tether not having an optional second portion, the second loop 68 would be similarly located at the end of the first portion 40 opposite the first loop 44 shown in FIG. 2a; however, no second portion would extend from the second loop.) As shown in FIG. 2c, the second loops 68, 72 may be formed from the respective tethers 32, 36 by folding over a portion of the tether and sewing the tether to itself. Alternatively, a second loop may be formed from a separate piece of material sewn directly to the tether or may be woven directly into the tethers. If the second loop is formed from a separate piece of material, the separate piece would be folded to form a loop. The ends of the separate piece may be overlapped and then stitched to the tether. Alternatively, only one end of the separate piece may be stitched to the tether and the other, folded-over end of the separate piece may be stitched to the separate piece (but not to the tether), thereby forming a loop.

Referring to FIG. 2c, the air bag assembly 12 further includes optional third loops 76, 80 or ring elements. The third loops 76, 80 are releaseably restrained by a tether release mechanism 84. (If no optional third loops are used, the release mechanism 84 would directly restrain the second loops 68, 72.) The remotely located sensing system described above detects selected criteria during a collision (e.g., vehicle speed, impact force, etc.). Based upon such criteria, the second amount of expansion 28 may be indicated as preferable. In that instance, the sensing system sends a signal to the release mechanism 84 to be actuated (i.e., to release the tethers 32, 36). A variety of release mechanism configurations may be employed. For instance, as disclosed in U.S. Pat. No. 6,390,501, a moveable cantilevered retaining pin may be used to hold the tethers, or, upon actuation, move and thereby release the tethers. The retaining pin may pass through barriers so that the tethers may not slide off at either end of the pin and may be moved through holes in the barriers to release the tethers. The tether may be attached to a cantilevered stationary pin and held in place by a moveable barrier which frees one end of the pin to release the tether. The release mechanism may include a scraper element to assist tether release. U.S. Pat. No. 6,511,094, which is hereby incorporated by reference in its entirety, also discloses an air bag system with a release mechanism having such a scraper element. U.S. Pat. No. 6,390,501 further includes a moveable member operatively connected to a release mechanism (i.e., the retaining pin described above) and moveable by an actuation mechanism, a vent opening within a housing in which the inflator is disposed, the moveable member being alignable with the vent opening and being moveable relative to the vent opening upon actuation of the actuation mechanism, thereby adjusting the vent area of the vent opening during deployment of the cushion. Accordingly, movement of the moveable member may function only to release the tether via the release mechanism, or may function both to release the tether and to control the vent area available for gases from the inflator to pass outside of the cushion and housing, as disclosed in the above referenced patent.

Referring to FIG. 2c, the third loops 76, 80 are further connected to the second loops 68, 72 on the tethers 32, 36. When tether release mechanism 84 releases the third loops 76, 80, the second loops 68, 72 are also thereby released from the tether release mechanism 84. The tether release mechanism 84 is shown in phantom in FIG. 2b to denote its movement upon actuation to release the tethers 32, 36. Accordingly, referring to FIG. 2c, when the third loops 76, 80 are released, the tethers 32, 36 are no longer restrained at the second loops 68, 72 and the cushion 14 may achieve a second amount of expansion 28 upon inflation, as shown in FIG. 2b. Thus, the first tether 32 restricts the cushion 14 to the first amount of expansion 24 (shown in FIG. 2a) when restrained (at the second loop 68) and restricts the cushion 14 to the second amount of expansion 28 (shown in FIG. 2b) after the first tether 32 is released.

Referring again to FIG. 2a, the first tether 32 may include a lateral tether element 88. The lateral tether element 88 is supported at substantially opposing points of attachment at the cushion 14, a first lateral point of attachment 92 and a second lateral point of attachment 96. The lateral points of attachment 92, 96 are substantially laterally disposed with respect to the first portion 40 of the first tether 32. The lateral tether element 88 provides air bag restraint in a lateral direction. If the optional section portion 52 shown in FIG. 2a is not included, the first tether 32 will be secured only at first location 48 and lateral points of attachment 92, 96 (shown in FIG. 2a). Accordingly, upon release of the third loop 76 (shown in FIG. 2c) the first tether 32 would move free of any restraint at a second location and the cushion would be inflatable to a second amount of fore-aft expansion unaffected by the length of the first tether 32. The use of tethers not having a second portion and being releasable as described above will be readily understandable to those skilled in the art.

Figure 3A:
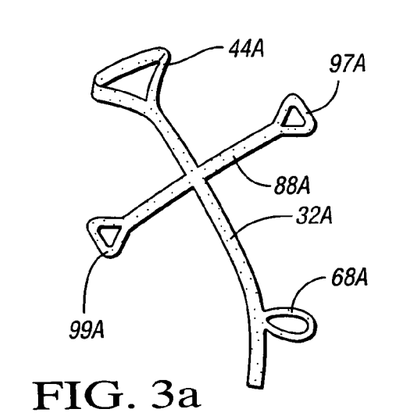
FIGS. 3a–3d are schematic perspective illustrations of alternative tether designs, including a lateral tether portion, for use in the air bag assembly of FIGS. 2a–2b.
Figure 3B:
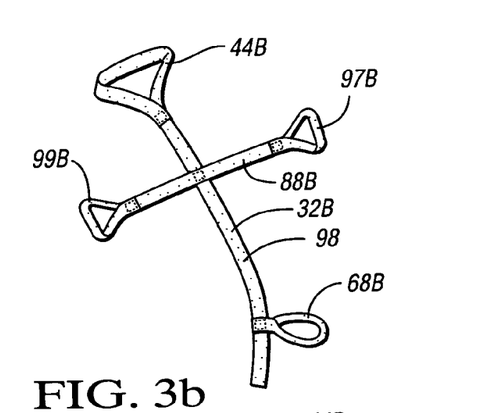
Figure 3C:
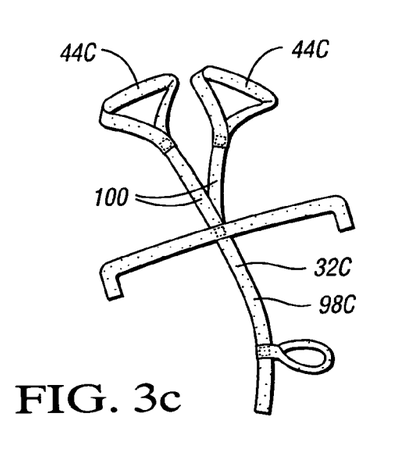

As can be viewed in FIGS. 2a–2b, the first tether 32 may be a single strip of material sewn to itself to form the first loop 44 and the second loop 68 and also sewn at the first and second lateral points of attachment 92, 96 to form the lateral tether element 88. Alternatively, as shown in FIG. 3a, a first tether 32A may be a single woven piece of material including a lateral tether element 88A, a first loop 44A and a second loop 68A. Accordingly, the first tether 32A and the lateral tether element 88A may be unitary. Looped lateral ends 97A, 99A may also be formed in the lateral tether element 88A. An alternative is to replace looped lateral ends 97A and 99A with non-looped ends (as shown in FIG. 3c). As shown in FIG. 3b, a lateral tether element 88B may be formed from a separate piece of material sewn or otherwise adhered to a first tether 32B. A first loop 44B and a second loop 68B may be formed from separate material sewn or otherwise adhered to a tether longitudinal midportion 98 to become part of first tether 32B. Accordingly, the lateral tether element 88B, once sewn to the first tether 32B, becomes integral with the first tether 32B. As shown in FIG. 3b, looped lateral ends 97B, 99B may be sewn or otherwise adhered to the lateral tether element 88B. The looped lateral ends 97B, 99B may be further secured to the cushion 14.

Figure 3D:
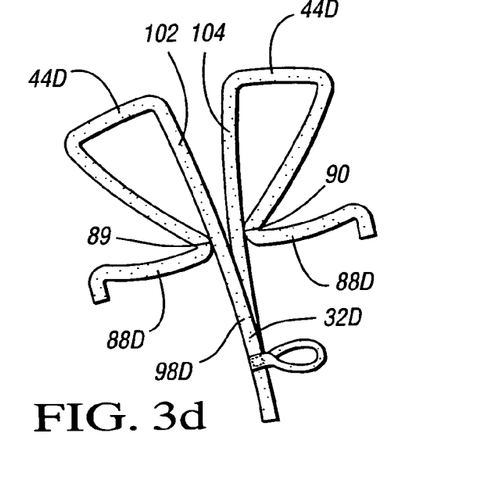

Referring to FIG. 3c, a single first tether 32C may be formed with multiple first loops 44C, as shown in FIG. 3c, by separating a tether longitudinal midportion 98C into separate segments 100 or by sewing or otherwise attaching such segments 100 to the tether longitudinal midportion 98C. Alternatively, as shown in FIG. 3d, a tether longitudinal midportion 98D of a single first tether 32D may be split into separate strips 102, 104 which are configured into first loops 44D and lateral tether elements 88D. The lateral tether elements 88D and the strips 102, 104 would be sewn or otherwise attached together as a unit at locations 89, 90, respectively.

Figure 3E:
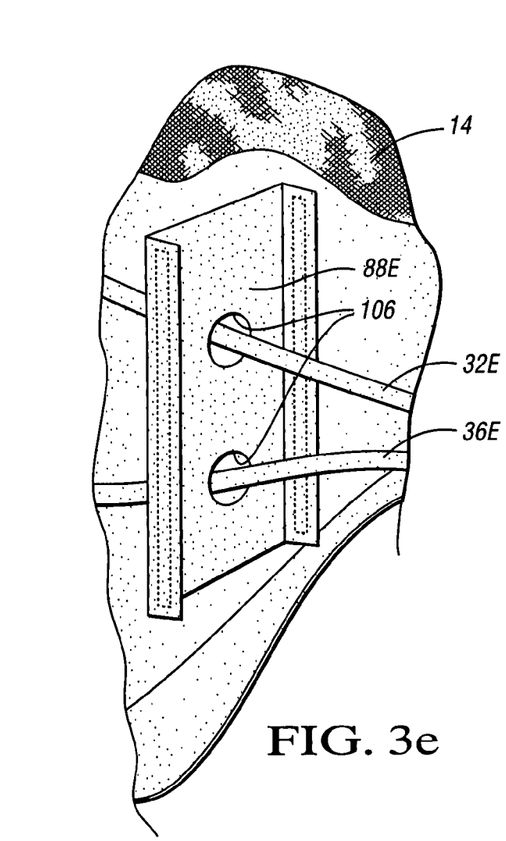
FIGS. 3e–3g are schematic fragmentary perspective illustrations of additional alternative tether designs for use in the air bag assembly of FIGS. 2a–2b.
Figure 3F:
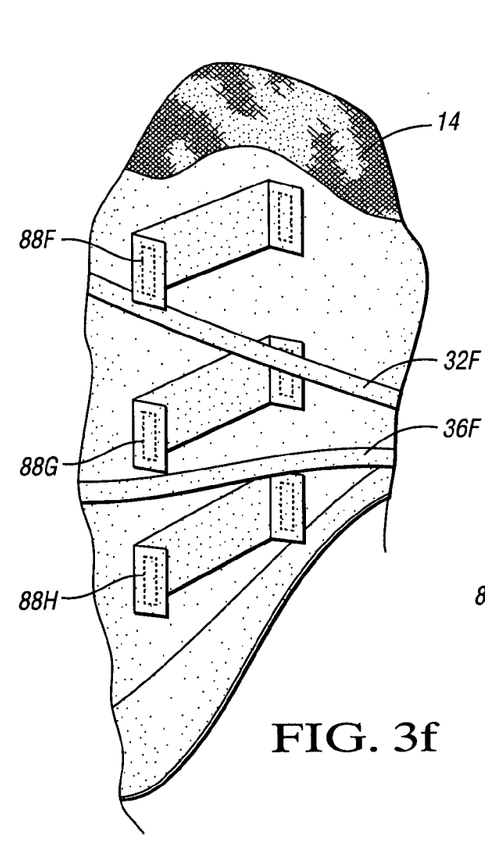
Figure 3G:
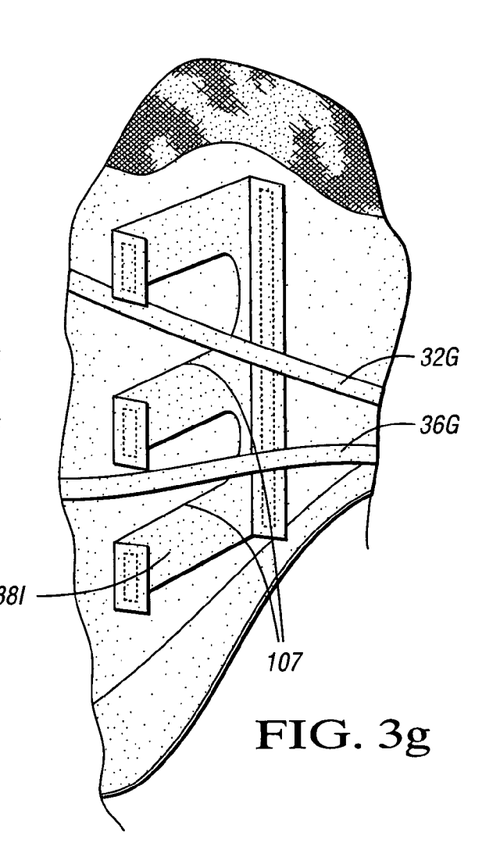

Additional lateral tether configurations are shown in FIGS. 3e–3g. In FIG. 3e, a lateral tether element 88E is formed with holes 106. First and second tethers 32E, 36E pass through the holes 106. In FIG. 3f, a multitude of separate lateral tether elements 88F, 88G, 88H, are secured to the cushion 14. First and second tethers 32F, 36F are configured to be disposed between the separate lateral tether elements 88F, 88G, 88H. In FIG. 3g, a continuous lateral tether element 88I is formed with slots 107 permitting the first and second tethers 32G, 36G to pass through the slots 107.

Figure 4A:
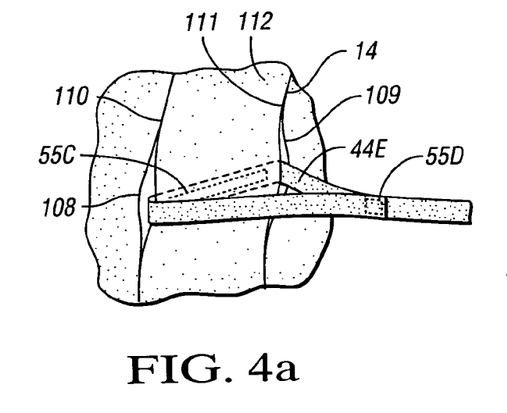
FIGS. 4a–4d are schematic fragmentary perspective illustrations of alternative tether to air bag cushion attachment arrangements, including a support element, for use in the air bag assembly of FIGS. 2a–2b.

The discussion will now turn to alternative methods for supporting the first loop at the first location at the cushion. Referring again to FIG. 2a, the first loop 44 is attached directly to the cushion 14 at the first attachment location 48. As shown in FIG. 4a, first loop 44E may be routed through holes 108, 109 in seams 110, 111 at an outer panel 112 of the cushion 14. As shown with stitching 55C, the first loop 44E may be sewn or otherwise attached to the outer panel 112. After routing the first loop 44E, holes 108, 109 would be sewn shut and stitching 55D would be added to complete first loop 44E.

Figure 4B:
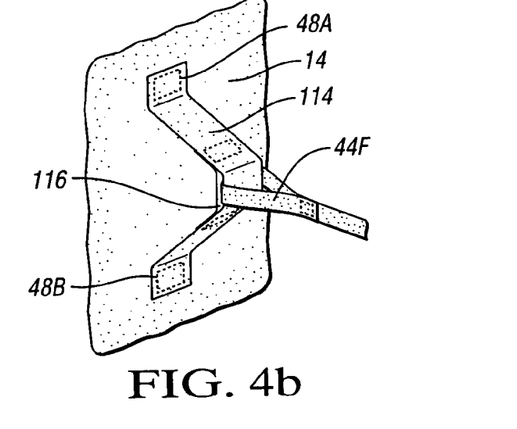

Referring to FIG. 4b, a support element 114 is secured to the cushion 14 at first attachment locations 48A, 48B. A first loop 44F is routed around the support element 114. An optional additional reinforcement element 116 is secured to the support element 114 for further supporting the first loop 44F. The support element 114 is shown as a panel with first attachment locations 48A, 48B being sewn seams spaced apart from one another securing the support element 114 to the cushion 14. Notably, a first tether having a first loop 44F secured at reinforcement element 116 or support element 114 by routing adjacent thereto need not slide through the support element 114 or the reinforcement element 116 in order for the cushion to obtain either the first amount of expansion 24 or, after release of the first tether, the second amount of expansion 28, shown in FIGS. 2a and 2b, respectively. Absence of such sliding may help produce a consistent bag profile upon inflation.

Figure 4C:
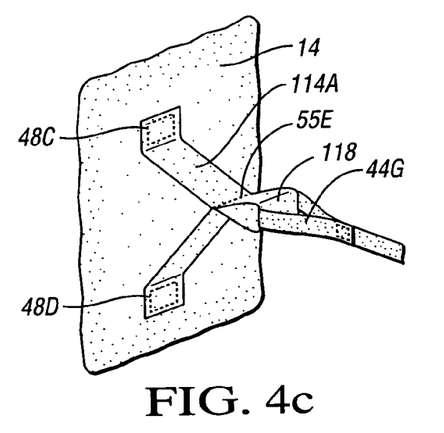

Referring to FIG. 4c, support element 114A secured to the cushion 14 at first attachment locations 48C, 48D may include a reinforcement element loop portion 118 (formed by stitching 55E) through which first loop 44G is routed.

Figure 4D:
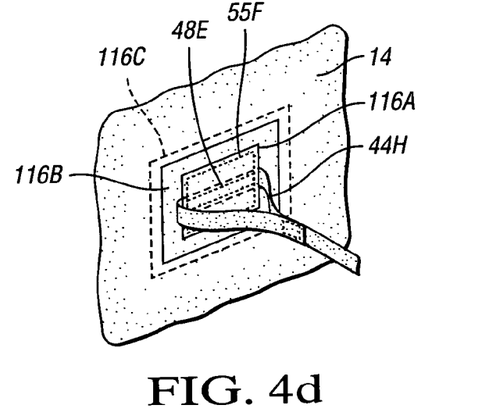

Referring to FIG. 4d, optional reinforcement elements 116A, 116B may be used to secure first loop 44H to the cushion 14. A first reinforcement element 116A is shown secured to the first loop 44H at a first attachment location 48E. A second optional reinforcement element 116B is shown placed between the cushion 14 and the first loop 44H and is used to strengthen the area where the first loop 44H is secured to the cushion 14. A third optional reinforcement element 116C is shown in phantom and is located at the opposed exterior face of the cushion 14 for further strengthening the attachment area. These reinforcements may be attached to cushion 14 by stitching 55F.

Figure 5A:
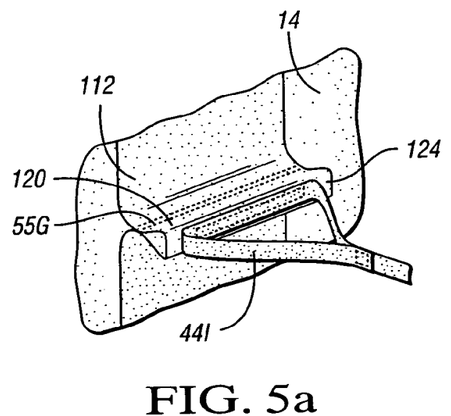
FIGS. 5a–5g are schematic fragmentary perspective illustrations of additional alternative tether to air bag cushion attachment arrangements for use in the air bag assembly of FIGS. 2a–2b.
Figure 5B:
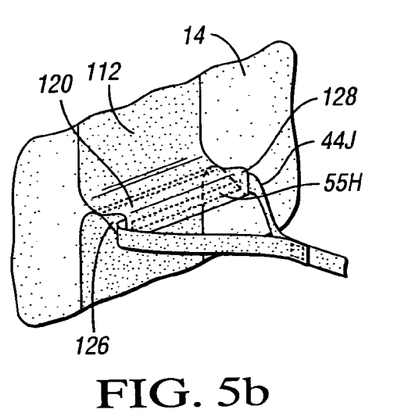
Figure 5C:
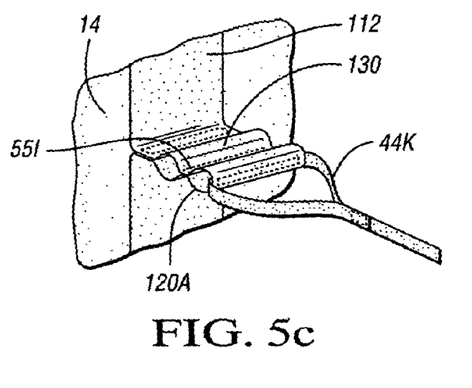
Figure 5D:
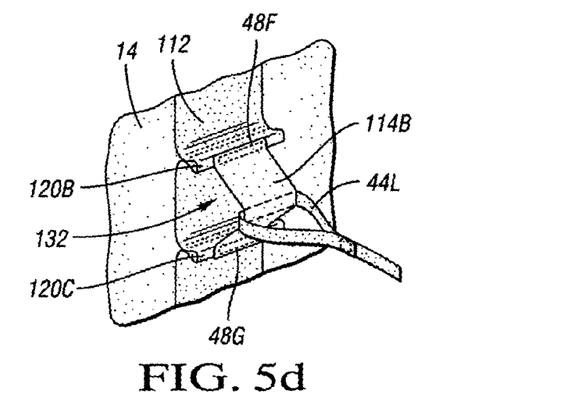

Referring now to FIGS. 5a through 5g, air bag assembly configurations having various support elements will now be discussed. In FIG. 5a, a support element which is a first tubular slot 120 is shown formed in the outer panel 112 of the cushion 14 by stitching 55G securing the outer panel 112 to itself. A first loop 44I is then secured to an outer surface 124 of the first tubular slot 120 by sewing or other means of securement. Referring to FIG. 5b, first loop 44J may route through open ends 126, 128 of the first tubular slot 120. Optional stitching 55H may be used to secure the first loop 44J to the first tubular slot 120. Alternative means of securing the first loop 44J to the first tubular slot 120, such as adhesives, may also be employed. Referring to FIG. 5c, an optional second tubular slot 130 may be formed by sewing stitching 55I between the second tubular slot 130 and a first tubular slot 120A which supports first loop 44K. Referring to FIG. 5d, a pair of first tubular slots 120B, 120C may be formed in the cushion outer panel 112. A separate support element 114B may be secured to each of the tubular slots 120B, 120C at opposing first attachment locations 48F, 48G. A first loop 44L may be routed through an opening 132 between support element 114B and the cushion outer panel 112. The first loop 44L may be sewn or otherwise secured to the support element 114B.

Figure 5E:
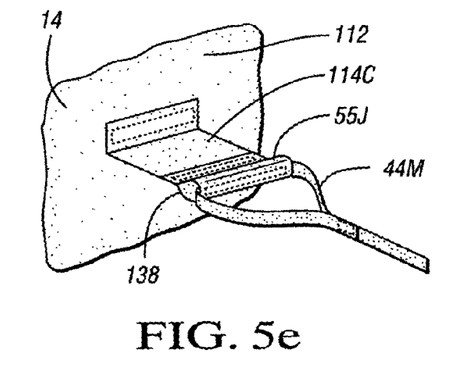

Referring to FIG. 5e, the support element 114C having a support element loop 138 formed at one end may be secured to the cushion outer panel 112. A first loop 44M may be routed through and optionally sewn with stitching 55J to the support element loop 138.

Figure 5F:
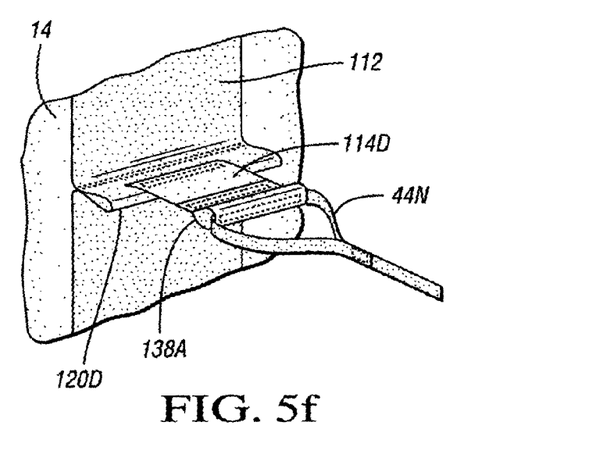

Referring to FIG. 5f, a similar support element 114D which is a panel having a support element loop 138A formed at one end may alternatively be secured to a tubular slot 120D formed in the cushion outer panel 112. A first loop 44N of a first tether may be routed through and optionally stitched or otherwise secured to the support element loop 138A. Accordingly, the support element 114D is disposed between the tubular slot 120D and the first loop 44N.

Figure 5G:
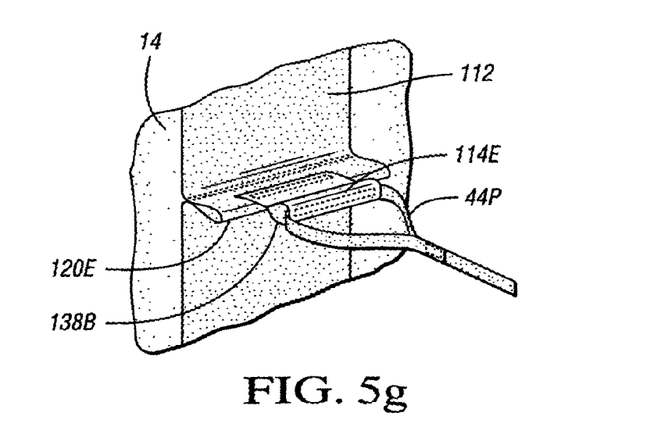

Referring to FIG. 5g, the cushion outer panel 112 may be formed with a first tubular slot 120E to which a support element 114E formed into a support element loop 138B is stitched or otherwise secured. A first loop 44P of a tether may be routed through and optionally stitched or otherwise secured to the looped support element 114E.

Notably, in all of the tether configurations shown in FIGS. 1–5g, including when a support element is used or when a tubular slot is used, the tether need not slide along its longitudinal portion (also referred to as a midportion, as described in FIGS. 3b–3d) in order for the cushion to inflate to either the first amount of expansion or to the second amount of expansion. All of the configurations in FIGS. 4a–5g may be applied to tethers with or without a lateral tether element.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

The invention claimed is:

1. An air bag assembly for use in a vehicle for impact restraint, the air bag assembly comprising:
   an air bag cushion inflatable to first and second amounts of expansion and deployable in an interior space of the vehicle, wherein said second amount of expansion is greater than said first amount of expansion;
   at least one tether having a first portion;
   wherein said first portion includes a first loop, wherein said first loop is a closed loop and is supported at a first location at the cushion; and
   at least one support element at said first location;
   wherein said first loop is secured at said at least one support element; and
   wherein said at least one tether is releasably restrained such that the cushion is inflatable to the first amount of expansion when said at least one tether is so restrained and the cushion is inflatable to the second amount of expansion after said at least one tether is released.

2. The air bag assembly of claim 1, wherein said at least one tether has a second portion;
   wherein said second portion is supported at a second location substantially opposing said first location; and
   wherein said at least one tether is releasably restrained between said first and second portions.

3. The air bag assembly of claim 2, wherein said second location is at the cushion.

4. The air bag assembly of claim 2, further comprising:
   support structure;
   wherein the cushion is secured at said support structure; and
   wherein said second location is at said support structure.

5. The air bag assembly of claim 1, wherein said at least one tether has a longitudinal portion extending from said first loop, and wherein said longitudinal portion does not route through said at least one support element after said at least one tether is released.

6. The air bag assembly of claim 1, wherein the cushion is formed with openings and said at least one tether routes through said openings.

7. The air bag assembly of claim 1, wherein said at least one support element is at least one tubular slot formed in the cushion.

8. The air bag assembly of claim 7, wherein the first loop is secured to the tubular slot.

9. The air bag assembly of claim 7, further comprising at least one panel secured to said at least one tubular slot and disposed between said at least one tubular slot and said first loop.

10. The air bag assembly of claim 1, wherein said at least one support element is a panel, and wherein the panel is secured to the cushion by sewn seams spaced apart from one another.

11. The air bag assembly of claim 1, further comprising:
    at least one reinforcement element secured to one of said at least one support element and said first loop at said first location.

12. The air bag assembly of claim 1, further comprising:
    a tether release mechanism for releasably restraining said at least one tether.

13. The air bag assembly of claim 12, further comprising:
    an inflator activatable to discharge inflation gas upon the occurrence of predetermined vehicle conditions;
    wherein the cushion is in fluid communication with the inflator such that upon discharge of inflation gas from the inflator, the cushion is inflated;
    an actuation mechanism activatable based upon measurements from one or more sensors measuring conditions of an occupant during activation of the inflator to release said at least one tether upon occurrence of predetermined occupant conditions; and
    an actuatable variable inflation device to control the amount of inflation gas discharged into the air bag cushion and wherein the actuatable variable inflation device comprises a moveable member alignable with a vent opening within a housing in which the inflator is disposed, the moveable member being moveable relative to the vent opening upon activation of the actuation mechanism thereby adjusting the effective venting area of the vent opening during deployment of the cushion.

14. The air bag assembly of claim 1, wherein said at least one tether includes a second loop; and
    wherein said at least one tether is releasably restrained at said second loop.

15. The air bag assembly of claim 14, wherein said second loop is formed from said at least one tether.

16. The air bag assembly of claim 14, further comprising:
    a third loop connected to said second loop;
    wherein said at least one tether is releasably restrained at said third loop.

17. The air bag assembly of claim 1, wherein said at least one support element forms a loop; and wherein said first loop is secured at said loop formed by said at least one support element.

18. An air bag assembly for use in a vehicle for impact restraint, the air bag assembly comprising:
    an air bag cushion inflatable to first and second amounts of expansion and deployable in an interior space of the vehicle, wherein said second amount of expansion is greater than said first amount of expansion;
    at least one tether having a first portion;
    wherein said first portion includes a first loop, wherein said first loop is a closed loop and is supported at a first location at the cushion; and
    wherein said at least one tether is releasably restrained such that the cushion is inflatable to the first amount of expansion when said at least one tether is so restrained and the cushion is inflatable to the second amount of expansion after said at least one tether is released; and
    at least one lateral tether element supported at opposing lateral locations at the cushion, wherein said opposing lateral locations are substantially laterally disposed with respect to said first portion.

19. The air bag assembly of claim 18, wherein said at least one lateral tether element is integral with said at least one tether.

20. The air bag assembly of claim 18, wherein said at least one tether and said at least one lateral tether element are unitary.

21. The air bag assembly of claim 18, wherein said at least one lateral tether element is formed with an opening and wherein said at least one tether routes through said opening.

22. An air bag assembly for use in a vehicle for impact restraint, the air bag assembly comprising:
    an air bag cushion inflatable to first and second amounts of expansion and deployable in an interior space of the vehicle, wherein said second amount of expansion is greater than said first amount of expansion;
    at least one tether having a first portion and a second portion, wherein the first portion is formed into a first loop, wherein said first loop is supported at a first location at the cushion, and wherein the second portion is supported at a second location substantially opposing said first location;

at least one lateral tether element supported at opposing points of attachment at the cushion, wherein said opposing points are substantially laterally disposed with respect to said first portion;

wherein said at least one tether includes a second loop disposed between said first and second portion; and wherein said at least one tether is releasably restrained at said second loop such that the cushion is inflatable to the first amount of expansion when said at least one tether is restrained and the cushion is inflatable to the second amount of expansion after said at least one tether is released.

23. The air bag assembly of claim 22, wherein said at least one lateral tether element is integral with said at least one tether.

24. The air bag assembly of claim 22, wherein said at least one tether and said at least one lateral tether element are unitary.

* * * * *